United States Patent [19]
Mizumoto et al.

[11] Patent Number: 5,007,882
[45] Date of Patent: Apr. 16, 1991

[54] BELT TRANSMISSION FOR VERY SMALL SIZE SHOVEL CAR

[75] Inventors: Takeshi Mizumoto; Yoshiaki Murakami, both of Ehime, Japan

[73] Assignee: Kabushiki Kaisha Kobe Seiko Sho, Kobe, Japan

[21] Appl. No.: 555,650

[22] Filed: Jul. 23, 1990

[30] Foreign Application Priority Data

Aug. 7, 1989 [JP] Japan ............................ 1-204167

[51] Int. Cl.⁵ ........................... F16H 7/00; F16H 7/08
[52] U.S. Cl. .................................... 474/84; 37/103; 474/87
[58] Field of Search ........................ 474/84–89, 474/101, 109, 111, 113, 114, 115, 133, 135; 37/89, 90, 103, 117.5, DIG. 9

[56] References Cited

U.S. PATENT DOCUMENTS

| | | | |
|---|---|---|---|
| 3,871,461 | 3/1975 | Ehrlich | 474/87 X |
| 3,924,483 | 12/1975 | Walker et al. | 474/86 |
| 4,077,140 | 3/1978 | Branconi | 37/103 |
| 4,095,579 | 6/1978 | Iwasa et al. | 474/87 X |
| 4,679,336 | 7/1987 | Brocklebank et al. | 37/103 |

Primary Examiner—Thuy M. Bui
Attorney, Agent, or Firm—Oblon, Spivak, McClelland, Maier & Neustadt

[57] ABSTRACT

A belt transmission for a very small size shovel car which improves the starting performance of an engine for the shovel car to permit employment as such engine of a small size engine having a low output power. The belt transmission comprises a first pulley mounted on an output shaft of the engine, second and third pulleys mounted commonly on an input shaft of a transmission case of the shovel car, a first belt extending between and around the first and second pulleys, a belt tension clutch movable to and from an operative position in which it engages with the first belt to cause the first belt to transmit power from the first pulley to the second pulley, a fourth pulley mounted on an input shaft of a hydraulic pump of the shovel car, and a second belt extending between and around the third and fourth pulleys. When the belt tension clutch is in the operative position, power of the engine is transmitted to the second pulley to operate both of the transmission case and the hydraulic pump, but when the belt tension clutch is not in the operative position, no power is transmitted to the second pulley and neither of the transmission case and the hydraulic pump is operated.

2 Claims, 4 Drawing Sheets

BELT TRANSMISSION FOR VERY SMALL SIZE SHOVEL CAR

BACKGROUND OF THE INVENTION

1. Field of the Invention

This invention relates to a belt tramsmission for a very small size shovel car, and more particularly to a belt transmission for a very small size shovel car which includes an engine having a comparatively low output power.

2. Description of the Prior Art

Conventionally, a very small size shovel car which can carry out an excavating operation at a narrow place is not yet on the market. While a body of a very small size shovel car of the type mentioned must be small in size so as to facilitate excavating operation of the shovel car at a narrow place, it is also required that an engine which is used together with the body of a small size should be small in size.

When it is intended to produce such a very small size shovel car as described above, it must be taken into consideration that, since an engine of a small size is used, the output power of the engine is comparatively low, and there is the possibility that the starting performance of the engine may be excessively low when the outside air temperature is low. In particular, the output power of the engine is transmitted to an input shaft of a transmission case while a hydraulic pump must also be driven by the output power of the engine, and the load to the engine may be so high that the engine may not be started readily.

SUMMARY OF THE INVENTION

It is an object of the present invention to provide a belt transmission for a very small size shovel car which improves the starting performance of an engine for the shovel car to permit employment as such engine of a small size engine having a low output power.

In order to achieve the object, according to the present invention, there is provided a belt transmission for a very small size shovel car which includes an engine, a transmission case connected to the engine by way of the belt transmission for driving the shovel car to run, and a hydraulic pump for operating a working boom, which comprises a first pulley mounted on an output shaft of the engine, a second pulley mounted on an input shaft of the transmission case, a first belt extending between and around the first and second pulleys, a belt tension clutch movable to and from an operative position in which it engages with the first belt to cause the first belt to transmit power from the first pulley to the second pulley, a third pulley also mounted on the input shaft of the transmission case, a fourth pulley mounted on an input shaft of the hydraulic pump, and a second belt extending between and around the third and fourth pulleys. Preferably, the second and third pulleys are integrated into a double pulley.

With the belt transmission, if the belt tension clutch is moved to the operative position, then power of the engine is transmitted to the second pulley on the input shaft of the transmission case by way of the first belt to rotate the input shaft. When the input shaft is rotated, also the third pulley is rotated, and the hydraulic pump is driven by way of the third and fourth pulleys and the second belt. In this instance, the load applied to the output shaft of the engine is a total of a power for driving the input shaft of the transmission case and another power for driving the hydraulic pump.

On the other hand, if the belt tension clutch is moved away from the operative position, power of the engine is not transmitted to the input shaft of the transmission case, and neither of the second and third pulleys of the input shaft is rotated. Consequently, neither one of the transmission case and the hydraulic pump is driven, and the load applied to the output shaft of the engine is very low. Accordingly, even where the engine is of the type which produces a comparatively low output power, if the belt tension clutch is moved to the operative position, then power required for starting the engine is decreased to such a very level and the engine can be started readily. Accordingly, the starting performance of the engine is improved and the body of the shovel car to which the belt transmission is applied can be reduced in size due to a reduced size of the engine, which permits corresponding reduction of the overall size of the shovel car.

The above and other objects, features and advantages of the present invention will become apparent from the following description and the appended claims, taken in conjunction with the accompanying drawings.

DETAILED DESCRIPTION OF THE PREFERRED EMBODIMENT

Figure 1:
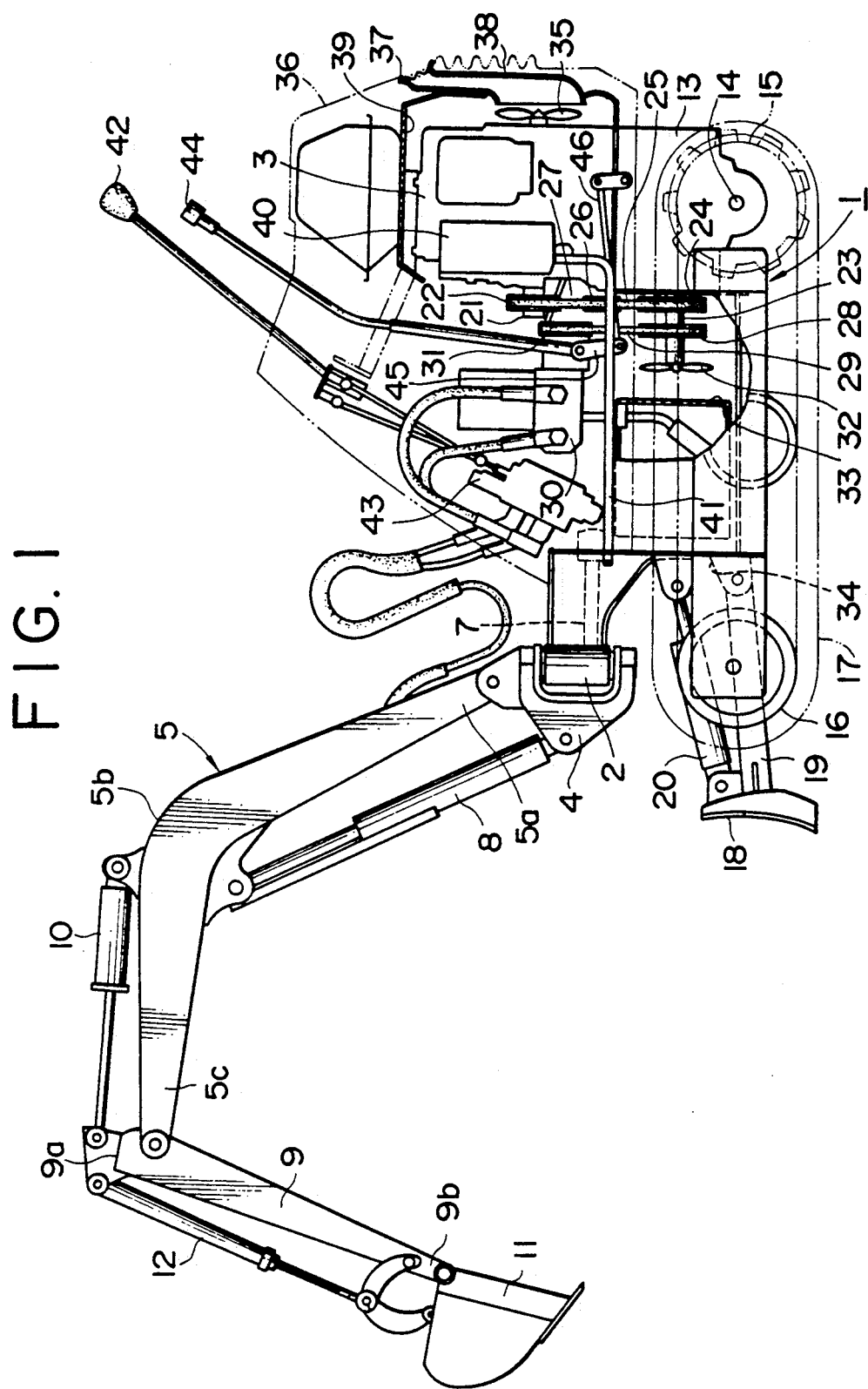
FIG. 1 is a side elevational view, partly in section, of a very small size shovel car in which a belt transmission according to the present invention is incorporated.
Figure 2:
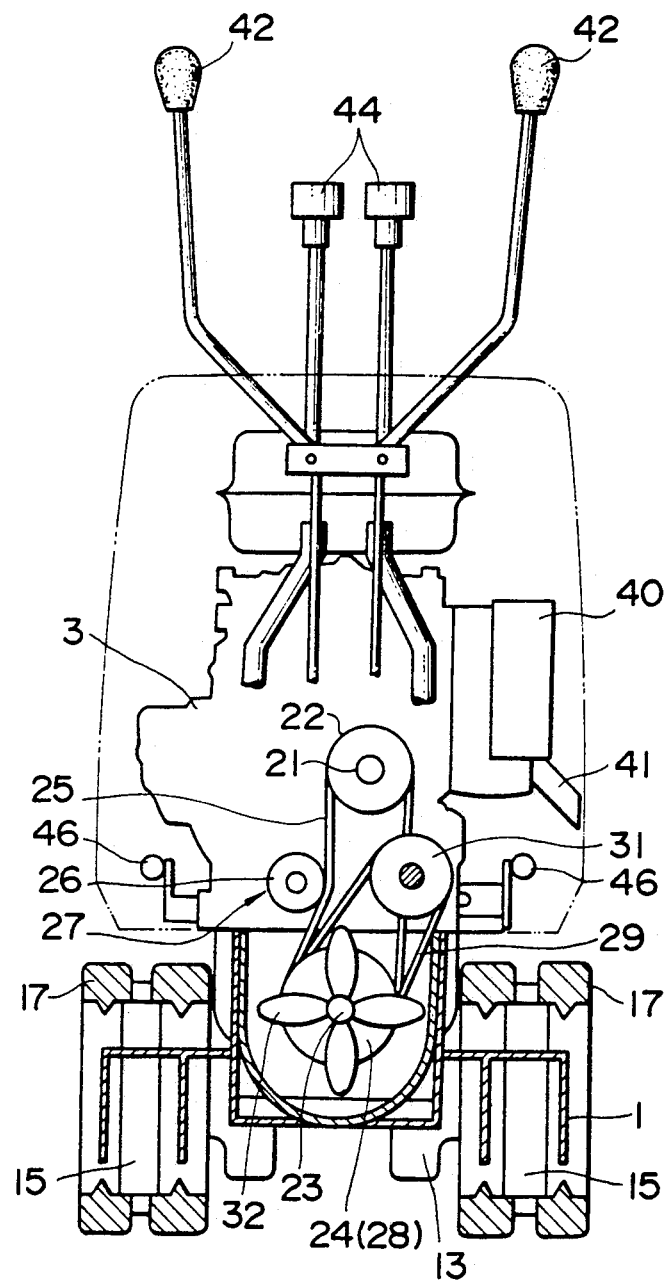
FIG. 2 is a sectional view of the very small size shovel car of FIG. 1 illustrating an arrangement of pulleys.
Figure 3:
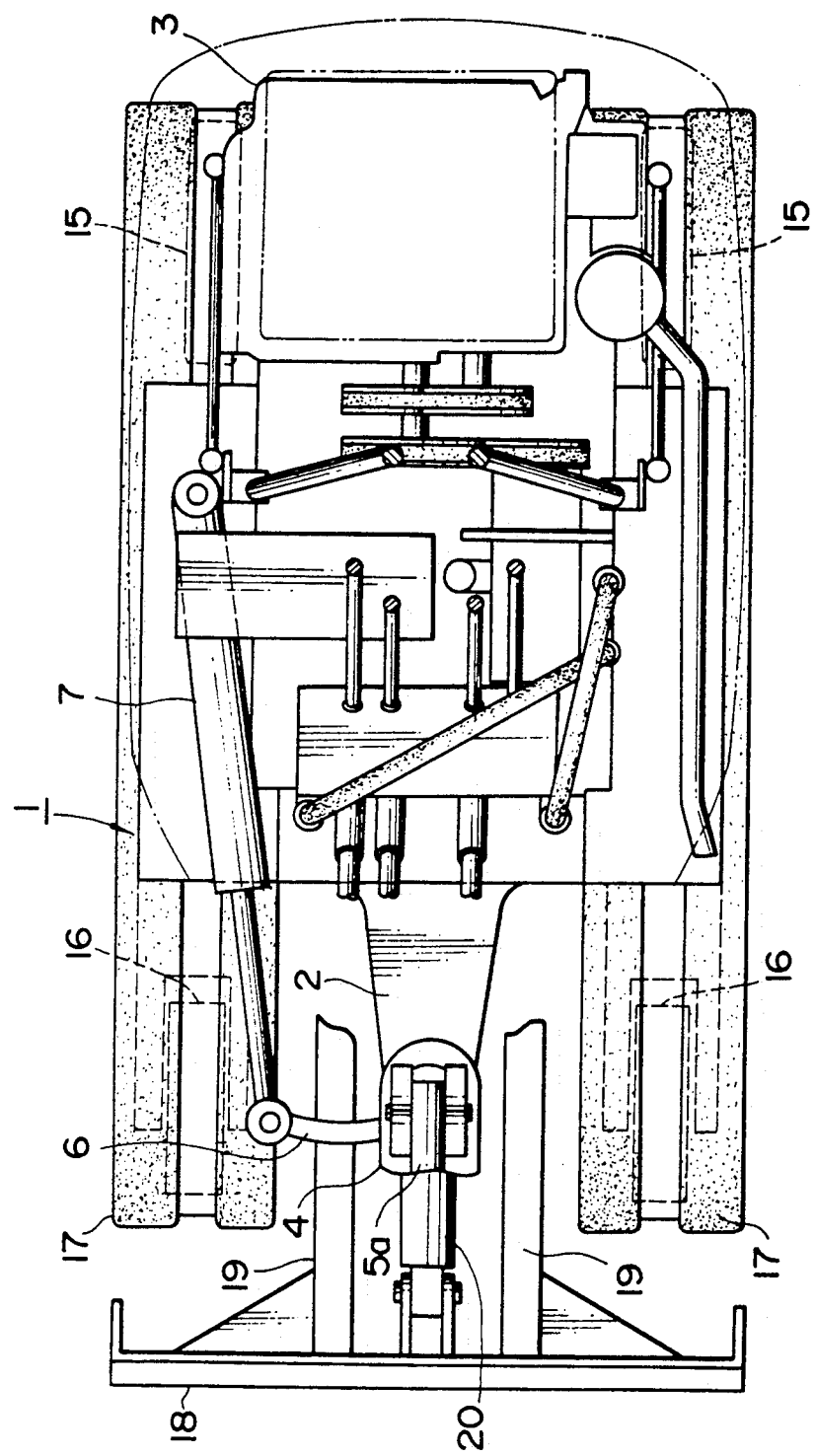
FIG. 3 is a plan view of the very small size shovel car of FIG. 1.
Figure 4:
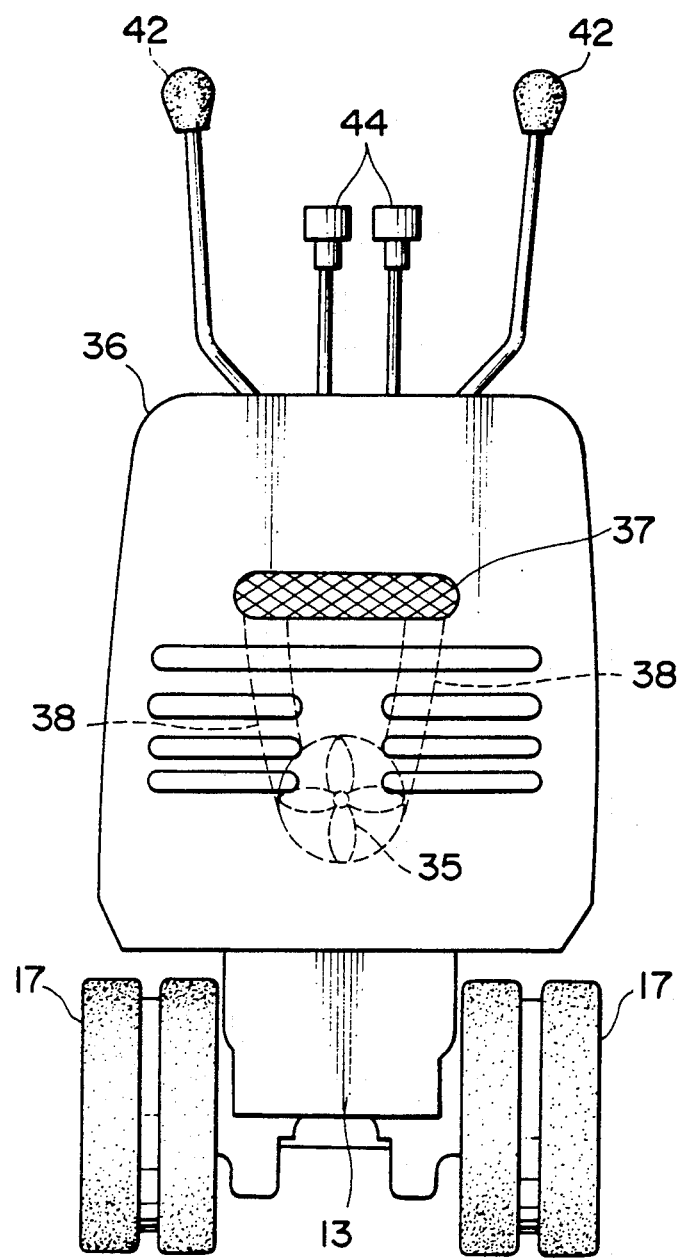
FIG. 4 is a rear elevational view of the very small size shovel car of FIG. 1.

Referring first to FIGS. 1 to 3, there is shown a very small size shovel car to which a belt transmission according to the present invention is incorporated. The very small size shovel car shown includes a frame 1, a mounting block 2 mounted at a front portion of the frame 1, and an engine 3 mounted at a rear portion of the frame 1. A swing bracket 4 is mounted on the mounting block 2, and a working boom 5 is mounted at a base portion 5a thereof for pivotal motion on the mounting block 2. An arm bracket 6 is provided on a side portion of the swing bracket 4, and a swing cylinder 7 mounted on a side portion of the frame 1 is connected at an end portion thereof for pivotal motion to the arm bracket 6 such that the boom 5 may be swung leftwardly and rightwardly by expanding or contracting motion of the swing cylinder 7. Meanwhile, the boom 5 is pivoted upwardly and downwardly by a boom cylinder 8 extending between the swing bracket 4 and an intermediate portion 5b of the boom 5. An arm 9 is mounted at an end portion 9a thereof for pivotal motion at an end portion 5c of the boom 5 such that it may be pivoted upwardly and downwardly by an arm cylinder 10 extending between the intermediate portion 5b of the boom 5 and the end portion 9a of the arm 9. A bucket 11 is mounted for pivotal motion at the other end 9b of the arm 9 such that it may be pivoted by a bucket cylinder 12.

A transmission case 13 is fixedly mounted on the frame 1 below the engine 3. A drive shaft 14 extends leftwardly and rightwardly from the opposite sides of the transmission case 13, and a pair of driving sprocket wheels 15 are mounted on the leftward and rightward extensions of the driving shaft 14. A pair of driven wheels 16 are mounted for rotation at left and right locations of a front lower portion of the frame 1, and a pair of crawlers 17 extend between and around the driven wheels 16 and driving sprocket wheels 15. A pair of arms 19 for a bulldozer blade 18 are mounted for pivotal motion on the frame 1 between the driven wheels 16 such that they may be moved upwardly and downwardly by a hydraulic cylinder 20.

An engine pulley 22 is mounted on an output shaft 21 which extends forwardly from the engine 13 while a transmission pulley 24 is mounted on an input shaft 23 of the transmission case 13, and a belt 25 extends between and around the two pulleys 22 and 24. A tension roller 26 is mounted for horizontal bodily movement toward and away from the belt 25 between the pulleys 22 and 24 and constitutes a belt tension clutch 27. If the the tension roller 26 is moved to strongly press against the belt 25, then tension is applied to the belt 25 so that rotation of the engine pulley 22 is transmitted to the transmission pulley 24 by way of the belt 25. On the other hand, if the tension roller 26 is moved reversely to cancel or reduce the pressing force thereof against the tension roller 25, then the belt 25 is stopped while yielding a slip between the engine pulley 22 and the belt 25. Consequently, rotation of the engine pulley 22 is no more transmsitted to the transmission pulley 24. Thus, transmission of power of the engine 3 to the input shaft 23 of the transmission case 13 or interruption of such transmission is controlled by putting the belt tension clutch 27 into an engaged or disengaged condition.

A pulley 28 is mounted on the input shaft 23 together with the transmission pulley 24, and power of the engine 3 is transmitted also to a pulley 31 of a hydraulic pump 30 by way of a belt 29 which extends between and around the pulleys 28 and 31. Here, the transmission pulley 24 and the pulley 28 may be formed as a double pulley. A fan 32 is mounted at a front end of the input shaft 23. Thus, the fan 32 is rotated by and together with the input shaft 23 to blow external air from rearwardly of the transmission case 13 toward an oil tank 33 located forwardly of the fan 32. Such external air first cools the oil tank 33 and then is exhausted forwardly of the car body by way of a discharge air port 34 perforated in a front wall of the frame 1.

Referring to FIGS. 1 and 3, another fan 35 is located on a rear wall of the frame 1 behind the engine 3, and a pair of air ducts 38 extend between an intake air port 37 perforated in a cover 36 and the fan 35. The fan 35 is rotated by power of the engine 3, and external air is sucked by way of the intake air port 37 and then passes the air ducts 38. The external air thus taken in is then guided by a guide plate 39 extending around the engine 3, then cools the engine 3, and finally is exhausted forwardly by way of an exhaust pipe 41 of a muffler 40. A pair of operating levers 42 are provided for manual operation to control movement of the boom 5 and the bucket 11. The operating levers 42 are connected to a control valve 43. Another pair of running levers 44 are provided for manual operation for the change-over control between forward and backward movements of the very small size shovel car. A pair of links 45 are provided at lower ends of the left and right running levers 44 and are connected to rods 46 disposed on the opposite left and right sides of the engine 3 and further connected to a shifter (not shown) in the inside of the transmission case 13 through the opposite left and right side walls of the transmission case 13.

With the very small size shovel car described above, if the belt tension clutch 27 is put into an engaged condition, then power of the engine 3 is transmitted to the transmission pulley 24 by way of the belt 25 to rotate the input shaft 23. In this instance, also the hydraulic pump 30 is driven by way of the belt 29 so that hydraulic operating fluid is pressure fed from the oil tank 33 to the control valve 32. Further, the fan 32 feeds, by rotation of the input shaft 23, cooling wind to the oil tank 33 to cool the oil tank 33. Thus, a total of a power which drives the input shaft 23 of the transmission case 13, another power which drives the hydraulic pump 30 and a further power which drives the fan 32 is applied to the output shaft 21 of the engine 3. Then, if the belt tension clutch 27 is put into a disengaged condition, then power of the engine 3 is not transmitted to the input shaft 23, and neither one of the input shaft 23, hydraulic pump 30 and fan 32 is driven. Accordingly, the load applied to the output shaft 21 of the engine 3 is very low.

Then, when the external air temperature is low in a winter season or the like and the starting performance of the engine 3 is low, if the belt tension clutch 27 is put into a disengaged condition to decrease the load to the output shaft 21 of the engine 3, then the engine 3 can be started readily even where it has a comparatively low output power.

Having now fully described the invention, it will be apparent to one of ordinary skill in the art that many changes and modifications can be made thereto without departing from the spirit and scope of the invention as set forth herein.

What is claimed is:

1. A belt transmission for a very small size shovel car which includes an engine, a transmission case connected to said engine by way of said belt transmission for driving said shovel car to run, and a hydraulic pump for operating a working boom, comprising a first pulley mounted on an output shaft of said engine, a second pulley mounted on an input shaft of said transmission case, a first belt extending between and around said first and second pulleys, a belt tension clutch movable to and from an operative position in which it engages with said first belt to cause said first belt to transmit power from said first pulley to said second pulley, a third pulley also mounted on said input shaft of said transmission case, a fourth pulley mounted on an input shaft of said hydraulic pump, and a second belt extending between and around said third and fourth pulleys.

2. A belt transmission according to claim 1, wherein said second and third pulleys are integrated into a double pulley.

* * * * *